US011600036B2

(12) United States Patent
Kozlowski et al.

(10) Patent No.: US 11,600,036 B2
(45) Date of Patent: Mar. 7, 2023

(54) SPATIOTEMPORAL SELF-GUIDED SHADOW DENOISING IN RAY-TRACING APPLICATIONS

(71) Applicant: NVIDIA Corporation, Santa Clara, CA (US)

(72) Inventors: Pawel Kozlowski, Campbell, CA (US); Alexey Panteleev, Los Gatos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 141 days.

(21) Appl. No.: 17/013,029

(22) Filed: Sep. 4, 2020

(65) Prior Publication Data
US 2022/0076481 A1 Mar. 10, 2022

(51) Int. Cl.
*G06T 15/06* (2011.01)
*G06T 15/60* (2006.01)

(52) U.S. Cl.
CPC .............. *G06T 15/06* (2013.01); *G06T 15/60* (2013.01)

(58) Field of Classification Search
CPC ................................ G06T 15/06; G06T 15/60
See application file for complete search history.

(56) References Cited

U.S. PATENT DOCUMENTS

| | | | |
|---|---|---|---|
| 2008/0019605 A1* | 1/2008 | Yea | G06T 5/50<br>382/261 |
| 2011/0019094 A1* | 1/2011 | Rossignol | G06T 5/40<br>382/168 |
| 2015/0116324 A1* | 4/2015 | Hayes | G06T 15/506<br>345/426 |
| 2016/0098820 A1* | 4/2016 | Rousselle | G06T 5/002<br>345/426 |
| 2016/0210777 A1* | 7/2016 | Zimmer | G06T 3/4007 |
| 2018/0204307 A1* | 7/2018 | Schied | G06V 10/82 |
| 2019/0065761 A1* | 2/2019 | Anderson | G06T 15/005 |
| 2019/0139296 A1* | 5/2019 | Lakshman | H04N 19/597 |
| 2019/0287291 A1* | 9/2019 | Liu | G06T 15/506 |

OTHER PUBLICATIONS

Wikipedia, Bernoulli distribution, May 2020, pp. 1-5 (Year: 2020).*

(Continued)

*Primary Examiner* — Phuc N Doan
(74) *Attorney, Agent, or Firm* — Taylor English Duma L.L.P.

(57) ABSTRACT

In examples, a filter used to denoise shadows for a pixel(s) may be adapted based at least on variance in temporally accumulated ray-traced samples. A range of filter values for a spatiotemporal filter may be defined based on the variance and used to exclude temporal ray-traced samples that are outside of the range. Data used to compute a first moment of a distribution used to compute variance may be used to compute a second moment of the distribution. For binary signals, such as visibility, the first moment (e.g., accumulated mean) may be equivalent to a second moment (e.g., the mean squared). In further respects, spatial filtering of a pixel(s) may be skipped based on comparing the mean of variance of the pixel(s) to one or more thresholds and based on the accumulated number of values for the pixel.

23 Claims, 9 Drawing Sheets

(56) References Cited

OTHER PUBLICATIONS

Schied, Spatiotemporal Variance-Guided Filtering: Real-Time Reconstruction for Path-Traced Global Illumination, 2017 (Year: 2017).*
Decora, Rendering Filters for Controlling Detail and Creating Effects (Year: 2009).*
Gumbau, Shadow map filtering with Gaussian Shadow Maps—2011 (Year: 2011).*
Deligiannis—Real-Time Rendering of Soft Shadows, Linkoping University—2019 (Year: 2019).*
Schied, C., Kaplanyan, A., Wyman, C., Patney, A., Chaitanya, C. R. A., Burgess, J., . . . & Salvi, M. (2017). Spatiotemporal variance-guided filtering: real-time reconstruction for path-traced global illumination. In Proceedings of High Performance Graphics (pp. 1-12).

* cited by examiner

SPATIOTEMPORAL SELF-GUIDED SHADOW DENOISING IN RAY-TRACING APPLICATIONS

BACKGROUND

Ray tracing is an approach used to render images by tracing a path of light in a virtual environment and simulating the effects of the light's interactions with virtual objects. Ray tracing techniques may be used to simulate a variety of optical effects—such as shadows, reflections and refractions, scattering phenomenon, and dispersion phenomenon (such as chromatic aberration). When rendering soft shadows using ray tracing, conventional approaches to shadow tracing may cast any number of shadow rays from a location in a virtual environment to sample lighting conditions for a pixel with respect to a light source. The ray-traced samples may be combined and applied to the pixel. In a penumbra (a region of a shadow where light is partially occluded) some of the shadow rays may be visible to the light source and others may be occluded. A large number of shadow rays may be needed in order for the combined lighting conditions to converge to an accurate result. To conserve computing resources and reduce rendering times, the shadow rays may be sparsely sampled, resulting in noisy render data. The noisy render data may be filtered using denoising techniques to reduce noise and produce a final render that more closely approximates a render of a fully-sampled scene.

A spatiotemporal filter may be used in denoising to combine spatial information from a current frame with temporally accumulated information to increase the effective sample count by leveraging information from previous frames. To avoid over blurring, conventional shadow denoising filters may be guided using ray-hit distance, where the filter radius is adapted based on distance to an occluder of a light source. This approach requires bandwidth for storing hit distances and denoising the hit distance data to account for its stochastic nature. Variance in color luminance has been used to guide a spatiotemporal filter that denoises color luminance in global illumination. While global illumination can provide shadowing to a render of an environment as part of accounting for direct and indirect illumination, conventional techniques are typically significantly more expensive than shadow tracing.

SUMMARY

Embodiments of the present disclosure relate to spatiotemporal self-guided shadow denoising. The disclosure provides approaches for adapting denoising filters, such as shadow denoising filters, based at least on variance in temporally accumulated ray-traced samples.

In contrast to conventional approaches for denoising ray-traced shadows, disclosed approaches may adapt a filter used to denoise shadows for a pixel(s) based at least on variance in temporally accumulated ray-traced samples. In various examples, a range of filter values for a spatiotemporal filter may be defined based on the variance and used to exclude a set of the temporal ray-traced samples that are outside of the range. In further respects, data used to compute a first moment of a distribution used to compute variance may be used to compute a second moment of the distribution. For binary signals, such as visibility, the first moment (e.g., accumulated mean) may be equivalent to a second moment (e.g., the mean squared). As such, computing resources may be conserved by only accumulating data used to derive one of the moments. In embodiments where the moments are not equivalent, the first moment may still be sufficient to define an approximation of the second moment. In further respects, spatial and/or temporal filtering of a pixel(s) may be skipped based at least on one or more of the mean and/or first moment of a distribution used to compute variance of the pixel(s) being less than or equal to a first threshold, or greater than or equal to a second threshold, and the accumulated number of values, or samples, for the pixel being greater than or equal to a third threshold.

BRIEF DESCRIPTION OF THE DRAWINGS

The present systems and methods for adaptive ray tracing suitable for shadow rendering are described in detail below with reference to the attached drawing figures, wherein.

DETAILED DESCRIPTION

Figure 1:
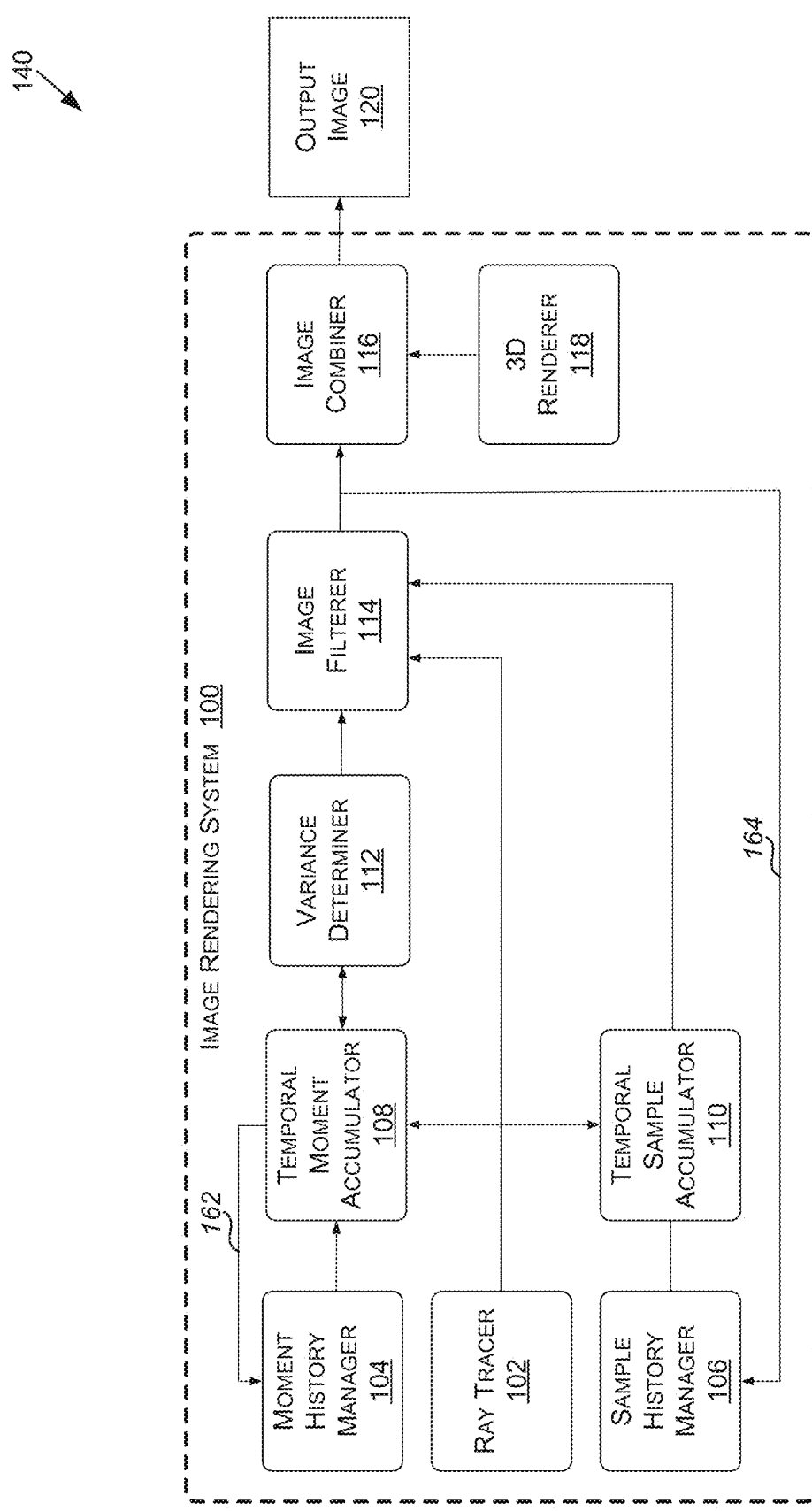
FIG. 1 is a data flow diagram illustrating an example process for generating an output image using an image rendering system, in accordance with some embodiments of the present disclosure.

The present disclosure relates to spatiotemporal self-guided shadow denoising. The disclosure provides approaches for adapting denoising filters, such as shadow denoising filters, based at least on variance in temporally accumulated ray-traced samples.

In contrast to conventional approaches for denoising ray-traced shadows, disclosed approaches adapt a filter used to denoise shadows for a pixel(s) based at least on variance in temporally accumulated ray-traced samples. Using disclosed approaches, shadows may be denoised without requiring the use of ray-hit distance to guide the filter, avoiding bandwidth for storing and denoising hit distance data or other more costly approaches.

In various examples, a range of filter values for a spatiotemporal filter may be defined based on the variance. In applying the spatiotemporal filter, a set of the temporal ray-traced samples may be excluded from filtering based on the set being outside of the range. The range may be at a maximum when the mean is between maximum and minimum values (e.g., between 0 and 1), with the maximum of the mean (e.g., 0.5) corresponding to regions which may be in a penumbra of a shadow. Further, the range may be at a minimum (e.g., 0) when the mean is at or near the maximum or minimum values, corresponding to regions that may be fully illuminated by a light source or that may be fully in a shadow.

In further respects, the disclosure provides approaches for computing variance used to guide filtering of temporally ray-traced samples (e.g., of visibility), based on first and second moments of accumulated samples. The first moment may comprise a mean of values of the temporally ray-traced samples and the second moment may comprise the mean of values squared. For binary signals, such as visibility, the mean may be accumulated over a number of frames, and the accumulated mean is equivalent to the mean squared. As such, memory bandwidth may be conserved by only accumulating data used to derive one of the moments, which may then be used to define the other moment of the distribution. For non-binary signals, while not equivalent, the accumulated mean may still be sufficient to use to define an approximation of the second moment.

In accordance with further aspects of the disclosure, spatial and/or temporal filtering of a pixel(s) may be skipped based at least on one or more of the mean and/or first moment of the distribution being less than or equal to a first threshold, or greater than or equal to a second threshold. For example, using a binary signal of visibility, spatiotemporal filtering may be skipped where the mean is 0 and/or where the mean is 1 and at least two values and/or frames have been accumulated. A mean of 0 may indicate the pixel is fully occluded, whereas a mean of 1 may indicate a pixel is fully lit. Additional factors used to determine whether to skip spatial and/or temporal filtering for a pixel may be based on the accumulated number of values (and/or frames) for the pixel being greater than or equal to a third threshold, such as 8 frames. Any of the various types of ray-traced samples may be adjusted for different embodiments and/or different types of ray-traced samples.

With reference to FIG. 1, FIG. 1 is a data flow diagram illustrating an example process 140 for generating an output image using an image rendering system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination, arrangement, or location. Various functions described herein as being performed by entities may be carried out by hardware, firmware, and/or software. For instance, various functions may be carried out by a processor executing instructions stored in memory. In at least one embodiment, the image rendering system 100 may be implemented, at least in part, in the data center 900 of FIG. 9. As various examples, the image rendering system 100 may comprise or be included in one or more of a system for performing simulation operations, a system for performing simulation operations to test or validate autonomous machine applications, a system for performing deep learning operations, a system implemented using an edge device, a system incorporating one or more Virtual Machines (VMs), a system implemented at least partially in a data center, or a system implemented at least partially using cloud computing resources.

Figure 2:
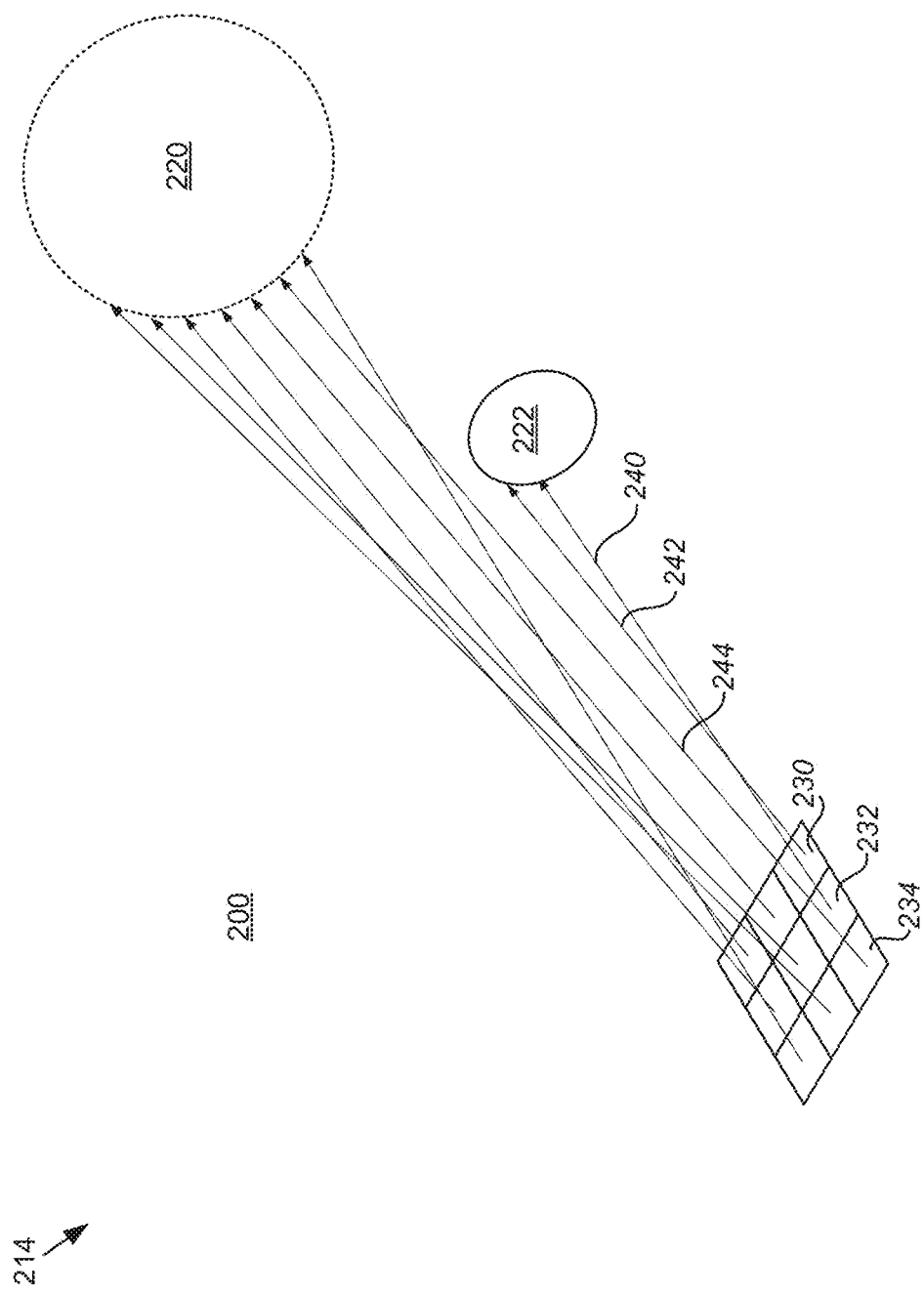
FIG. 2 is a diagram illustrating an example of capturing ray-traced samples of a virtual environment, in accordance with some embodiments of the present disclosure.

The image rendering system 100 may be configured to render images of virtual environments, such as a virtual environment 200 of FIG. 2. To render an image of a virtual environment, the image rendering system 100 may employ a ray tracer 102, a moment history manager 104, a sample history manager 106, a temporal moment accumulator 108, a temporal sample accumulator 110, a variance determiner 112, an image filterer 114, an image combiner 116, and a 3D renderer 118.

The ray tracer 102 may be configured to trace rays through a virtual environment using any of a variety of potential ray tracing techniques in order to generate ray-traced samples of one or more aspects of the virtual environment (e.g., lighting conditions) with respect to locations in the virtual environment. The temporal moment accumulator 108 may be configured to accumulate a spatial moment of a distribution used to compute variance in the ray-traced samples from the ray tracer 102 with data representing temporally accumulated values of the moment (e.g., representing a single value which may be a mean of the values) from the moment history manager 104 to update the data representing the temporally accumulated values of the moment. The moment history manager 104 may be configured to manage the data representing the temporally accumulated values of the moment (e.g., for each pixel), such as in a moment history buffer. The variance determiner 112 may compute variances for one or more particular pixels using the data representing the temporally accumulated values of the moment for the particular pixels and may provide the variances to the image filterer 114 for spatiotemporally filtering data corresponding to spatial ray-traced samples from the ray tracer 102.

The temporal sample accumulator 110 may be configured to accumulate ray-traced samples from ray tracer 102 with data representing temporally accumulated values of the ray-traced samples (e.g., representing a single value which may be a mean) from the sample history manager 106 to provide the data representing the temporally accumulated values of the ray-traced samples to the image filterer 114 for the spatiotemporal filtering of the data corresponding to spatial ray-traced samples from the ray tracer 102. The sample history manager 106 may be configured to manage the data representing the temporally accumulated values of the ray-traced samples (e.g., for each pixel), such as in a sample history buffer. In the example shown, the sample history manager 106 may use the spatiotemporal filtered ray-traced samples to update the sample history buffer.

In some embodiments, the image combiner 116 may combine data corresponding to the spatiotemporal filtered ray-traced samples (e.g., filtered shadow/visibility data) with data representing a 3D render of the virtual environment (e.g., without ray-traced shadow data) to generate an output image 120. The 3D renderer 118 may be configured to generate the 3D render using any suitable approach, which may or may not include ray tracing. In embodiments, the 3D render may comprise pixel color information for a frame of the virtual environment.

As described herein, the ray tracer 102 may be configured to trace rays through a virtual environment using any of a variety of potential ray tracing techniques in order to generate ray-traced samples of one or more aspects of the virtual environment with respect to locations in the virtual environment. Referring now to FIG. 2, FIG. 2 is diagram illustrating an example of capturing ray-traced samples of the virtual environment 200, in accordance with some embodiments of the present disclosure. The image rendering system 100 may be configured to use the ray tracer 102 to render an image using any number of ray tracing passes in order to sample conditions of a virtual environment. The example of FIG. 2 is described in relation to samples of visibility, and more particularly samples of visibility of the one or more pixels with respect to a light source in the virtual environment. However, disclosed approaches may be implemented with other types of ray-traced samples, which may include those which form a binary signal (e.g., have a value of 0 or 1). In some embodiments, the temporal ray-traced samples may represent, indicate, or otherwise correspond to ambient occlusion of the one or more pixels with respect to the virtual environment. When sampling different aspects of a virtual environment, ray tracing techniques may be adapted to suit the effect(s) being simulated.

Various examples of the rays which may be traced by the ray-tracer 102 through the virtual environment 200 are illustrated in FIG. 2 with respect to one or more ray tracing passes 214. For example, a ray 240, a ray 242, and a ray 244 are individually labeled amongst the nine rays shown for the ray tracing pass(es) 214. The ray tracer 102 may use the rays to collectively sample one or more aspects of the virtual environment with respect to locations in the virtual environment 200. Examples of nine locations are shown (of potentially many more such as one per pixel), of which locations 230, 232, and 234 are individually labeled. In at least one embodiment, each ray is associated with one of the locations (e.g., is cast from the location) and is used to generate a ray-traced sample for the location. For example, the ray 240 is associated with the location 232, the ray 242 is associated with the location 230, and the ray 244 is associated with the location 234.

In some embodiments, each location from which the ray tracer 102 casts a ray corresponds to a respective pixel. For example, locations, such as locations 230, 232, and 234, may be determined by transforming a virtual screen of pixels (e.g., from a z-buffer) into world-space. The virtual screen may be representative of a view of a camera in the virtual environment 200 and the locations may, in some embodiments, be referred to as pixels, or world-space pixels. In other examples, locations may not have such a one-to-one correspondence with pixels. Further, in other examples, the locations may be determined as respective points and/or areas at which respective eye-rays (e.g., cast from a camera through a virtual screen comprising the pixels) interact with the virtual environment 200.

In various embodiments, the accuracy of a sample at a location may be limited, as each ray may only provide partial information for the location. As such, using a limited number of rays to sample the virtual environment 200 may tend to cause noise in images, particularly for certain locations in the virtual environment 200. To illustrate an example of the forgoing, the rays used in the example shown are shadow rays used to sample one or more aspects of lighting conditions at locations with respect to a light source 220 in the virtual environment 200. The image rendering system 100 may use this information, for example, to render shadows in an image based on the lighting conditions at the locations. In some embodiments, rays are cast from locations to sample a random, or pseudo-random, position at the light source 220. The ray tracer 102 may use any suitable approach for ray tracing, such as stochastic ray tracing. Examples of stochastic ray tracing techniques that may be used include those that employ Monte Carlo or quasi-Monte Carlo sampling strategies. In the example shown, the ray tracer 102 casts one ray per location and/or pixel in the ray tracing pass(es) 214 for sampling. In other embodiments a different quantity of rays may be cast per location or pixel, no rays may be cast for certain locations or pixels, and/or different amounts of rays may be cast for different locations or pixels.

While only the light source 220 is shown, lighting conditions at locations may similarly be sampled with respect to other light sources and/or objects in the virtual environment 200, which may be combined with ray-traced samples derived with respect to the light source 220. In some examples, lighting conditions for different light sources may be determined and filtered separately (e.g., using the filtering techniques described with respect to FIG. 1), and combined by the image combiner 116 (e.g., as another input to the image combiner 116). Further, in the present examples, when a ray interacts with a location in the virtual environment 200 (e.g., at the light source 220 or an occluder 222), no additional ray may be cast from that location. However, for other ray tracing effects or techniques, one or more additional rays may be cast therefrom.

As shown, some of the rays, such as the ray 244, may interact with the light source 220 resulting in ray-traced samples indicating light from the light source 220 may illuminate corresponding locations. In some embodiments, rays that fall into this category may be assigned a visibility value of 1 to indicate they are visible with respect to the light source 220. Other rays, such as ray 240 and ray 242 may interact with an object resulting in ray-traced samples indicating light from the light source 220 is at least partially blocked and/or prevented from reaching the locations. An example of such an object is the occluder 222, which may block the rays from reaching the light source 220. In some embodiments, rays that fall into this category may be assigned a visibility value of 0 to indicate they are not visible with respect to the light source 220. As the visibility value may assume one of two potential values, it may correspond to a binary signal.

The location 230 is an example of a location that may be within a penumbra of a shadow cast by the occluder 222, and the lighting conditions may be more accurately computed by combining the ray-traced samples derived from multiple rays. For example, a ray-traced sample of the location 230 generated using only the ray 242 may indicate that the location 230 is completely blocked from receiving light from the light source 220. However, a ray-traced sample of the location 230 generated using another ray may indicate that the location 230 is at least partially illuminated by the light source 220.

Limiting the number of rays used to generate samples for locations may therefore cause noise resulting in visual artifacts in data rendered by the image rendering system 100. The image filterer 114 may be used to implement denoising techniques to reduce the noise. In various examples, the denoising techniques may include the image filterer 114 spatially and/or temporally filtering lighting condition data that corresponds to the ray-traced samples from the ray tracer 102. For example, the image filterer 114 may apply one or more spatial filter passes and/or temporal filter passes to the lighting condition data from the ray tracer 102.

Temporal filtering of the lighting condition data may leverage ray-traced samples that may be generated similarly to those described with respect to FIG. 2, but for previous states of the virtual environment 200 and/or previous output frames. Thus, the temporal filtering may increase the effective sample count of ray-traced samples used to determine the filtered lighting condition data for a pixel and/or may increase the temporal stability of the filtered lighting condition data for the pixel. However, as temporal ray-traced samples may correspond to different states of the virtual environment 200, certain samples may not be relevant or as relevant to the present state of the virtual environment 200 (e.g., objects or the camera may move, light sources may change), presenting the risk of visual artifacts when they are used for filtering. Disclosed embodiments may use variance in values that correspond to temporal ray-traced samples to guide temporal filtering, so as to reduce or eliminate these potential artifacts.

In accordance with disclosed embodiments, variance (e.g., per-pixel) in values that correspond to temporal ray-traced samples may be determined by the variance determiner 112 using a computation of variance that comprises a plurality of moments of a distribution. Variance refers to a measure of how far a set of values are spread out (e.g., from a mean or other reference value). A moment of the distribution used to compute variance refers to a quantitative measure of the shape of a function (e.g., a variance function). The moments in combination define the variance in the values. The variance Var in a set of values i may be determined based at least on Equation (1):

$$\mathrm{Var}(i) = \mu 1_i - \mu 2_i^2 \quad (1)$$

where µ1 is a first moment and µ2 is a second moment. The first moment µ1 corresponds to a mean of values and the second moment µ2 corresponds to the mean of the values squared.

In certain circumstances the first moment may be used to compute the second moment. For example, for binary signals, such as visibility, the mean may be equivalent to the mean squared. In particular, as described above, the second moment may be the mean of the values squared. A binary signal may have a value of 0 or 1, which is unchanged when the values are squared. To illustrate the forgoing, assume a sequence of visibility values: 1, 0, 1, 1, 0 (e.g., of a pixel over 5 frames). A mean of the values (e.g., first moment) is $(1+0+1+1+0)/5=$"0.6." The mean of the values squared (e.g., second moment) is $(1^2+0^2+1^2+1^2+0^2)/5=$"0.6." As such, the first moment may be used as the second moment in computing the variance. Thus, the variance may be computed using Equation (2):

$$\mathrm{Var}(i) = \mu 1_i - \mu 1_i^2 \quad (2)$$

In embodiments where the values correspond to a non-binary signal, a similar approach may be used. For example, while not equivalent, the first moment may be close enough to the second moment to use as the second moment and/or the second moment may otherwise be derived or approximated from the first moment. In some examples, the first moment may be adjusted using a factor or formula to derive the second moment. As further examples, the values may be rounded, grouped, or otherwise modified when computing the first moment, and the first moment may be used to derive the second moment. As an example, where the values are between 0 and 1 (or normalized to fall within that range), the values may be rounded to a nearest value (0 or 1) used to compute the first moment.

As described herein, the temporal moment accumulator 108 may compute and accumulate (using the moment history manager 104) the first moment (e.g., a mean) over a number of frames. As the first moment may be used to derive the second moment, bandwidth may be conserved by only accumulating data used to derive one of the moments, which may then be used to define the other moment of the distribution.

For temporal filtering, the temporal moment accumulator 108 may accumulate moments of variance in ray-traced lighting condition data for pixels from any number of previous states and/or frames of a virtual environment. The moment history manager 104 may store the accumulated moment used for temporal filtering in a moment history buffer, which may be updated for each rendered state and/or frame using an update 162. For example, in an iteration of the process 140, the temporal moment accumulator 108 may provide the data capturing temporally accumulated values of the moment to the variance determiner 112, which may compute variance values of pixels based at least on that data. In some examples, the temporal moment accumulator 108 may incorporate spatial values of the moment of the distribution for pixels with the corresponding temporally accumulated values of the moment, which may be captured by the data provided to the variance determiner 112. In any example, the update 162 may replace the currently stored temporally accumulated values with the updated temporally accumulated values for a subsequent iteration (e.g., state or frame).

Also for temporal filtering, the temporal sample accumulator 110 may accumulate samples of ray-traced lighting condition data for pixels from any number of previous states and/or frames of a virtual environment. The sample history manager 106 may store the accumulated samples used for temporal filtering in a sample history buffer, which may be updated for each rendered state and/or frame using an update 164. For example, in an iteration of the process 140, the temporal sample accumulator 110 may provide the data capturing temporally accumulated values of the ray-traced samples to the image filterer 114 for use in one or more filter passes. In some examples, the temporal moment accumulator 108 may incorporate spatial values of the samples with the corresponding temporally accumulated samples, which may be captured by the data provided to the image filterer 114. In any example, the update 164 may replace the currently stored temporally accumulated values with the updated temporally accumulated values for a subsequent iteration (e.g., state or frame).

The process 140 shows and describes the updates 162 and 164 with respect to certain approaches to temporal accumulation. However, in various embodiments, temporal accumulation for either update may be implemented using pre-accumulation, post-accumulation, and/or recurrent temporal accumulation (e.g., iteratively accumulating a frame of noisy render data with temporally accumulated data, then blurring the accumulated data to generate an output that is fed back to update the temporally accumulated data for a subsequent iteration).

In determining the temporally accumulated samples and/or moments, the number of accumulated samples and/or moments may, for example, be capped at a cap number (e.g., anywhere from eight to sixteen samples and/or moments). As an example, for each pixel, the temporal sample accumulator 110 may accumulate as many as eight ray-traced samples from eight previous frames, increasing the potential effective sample count by a factor of eight. Thus, where each rendered frame corresponds to a single sample per pixel, the temporal sample accumulator 110 may increase the effective sample count to as many as eight samples per pixel. The cap number(s) may remain constant or may change over time, such as based on states of the virtual environment 200. Further, the cap number may be different for samples and moments.

In various examples, a buffer (e.g., the moment history buffer and/or the sample history buffer) may comprise a rolling window of values (e.g., of up to the cap number of values) that may be updated for each rendered frame. In various examples, the data value of a pixel(s) (e.g., used in computing variance for the pixel(s)) may be an aggregation of a data value of the pixel(s) for the current state of the virtual environment 200 and data values for one or more previous states (e.g., frames) of the virtual environment 200. In determining an aggregate data value for a pixel, the temporal moment accumulator 108 and/or the temporal moment accumulator 108 may weigh each of the data values. For example, each data value may be weighted equally or different data values may be assigned different weights. In some examples, a historical data value for each pixel is accumulated in the buffer and is combined with the current spatial data value for the pixel to determine the aggregate data value for the pixel used for filtering. In various examples, the aggregate data value for the pixel(s) may be computed using an exponential moving average. The exponential moving average may be computed using a linear combination of the spatial data value with the temporally accumulated value each iteration, resulting in an exponential combination.

Along with temporally integrated lighting condition data (e.g., visibility data), and temporally integrated moment data, the image rendering system 100 may maintain (e.g., in a G-buffer) depth, object- or world-space normals, mesh identifiers (IDs), screen-space motion vectors and/or other information (e.g., spatial information) generated from a rasterization pass. The image rendering system 100 may also maintain a prior frame's depths, normals, mesh IDs and/or other information (e.g., spatial information from that frame). In various examples, any of this information may be used by the temporal moment accumulator 108 and/or the temporal sample accumulator 110 to temporally reproject samples and/or moments from one frame to another (e.g., to map pixels across frames). Where reprojection fails, spatial moment and/or sample data may be used.

The image filterer 114 may filter data using any of a variety of possible filtering techniques. In some examples, the image filterer 114 performs filtering using a cross (or joint) bilateral filter. The cross bilateral filter may replace each pixel by a weighted average of nearby pixels, using Gaussian-distributed weights that account for distance, variance, and/or other differences between pixels to guide images. Edge-stopping functions may be used to identify common surfaces using G-buffer attributes to improve the cross bilateral filter's robustness under input noise.

Any of the various filters and/or filter passes described herein may be applied using a filter kernel. The filters may also have one or more filter directions. The filter kernel of a filter may refer to a matrix (e.g., rectangular array) that defines one or more convolutions for processing image data (and/or lighting condition data or render data) for an image (e.g., data values of pixels) to alter one or more characteristics of the image, such as shades and/or colors of the pixels for the image. In some examples, a filter kernel may be applied as a separable filter. In applying a filter as a separable filter, the matrix may be represented using multiple sub-matrices, or filters, that may be separately applied to image data in multiple passes. When determining or computing a filter kernel for a separable filter, the disclosure contemplates that the sub-matrices may be directly computed, or may be derived from another matrix.

Each element of a matrix of a filter kernel may correspond to a respective pixel position. One of the pixel positions of a matrix may represent an initial pixel position that corresponds to a pixel to which the filter is applied and may be located at the center of the matrix (e.g., used to determine the location of the filter). For example, when applying a filter to a pixel corresponding to the location 232 of FIG. 2, the pixel may define the initial pixel position. In applying some filters, data values (e.g., visibility values) for other pixels may be used at image locations that are determined relative to the pixel to determine a data value(s) for the pixels within the footprint of the filter kernel. A filter direction may define the alignment of the matrix relative to the image and/or pixel to which the filter is applied along a filter width. Thus, when applying a filter to a pixel, other pixels for other pixel positions of a matrix of a filter kernel may be determined relative to the initial pixel position using the filter direction(s) and the filter kernel.

Each element of a matrix of a filter kernel may comprise a filter weight for the pixel position. The matrix may be applied to an image using convolution, in which a data value for each pixel of the image that corresponds to a pixel position of the matrix may be added or otherwise combined with data values for pixels that correspond to the local neighbors in the matrix, as weighted by the filter values (also referred to as filter weights). For one or more of the filters described herein, the filter values may be configured to blur the pixels, such as by fitting a distribution(s) to the filter kernel (e.g., to a width and a height).

The data values to which the filter(s) are applied may correspond to the lighting condition data (e.g., visibility data) for the pixels. Thus, applying a matrix of a filter kernel to a pixel may cause the lighting condition data to be at least partially shared amongst the pixels that correspond to the pixel positions of the filter kernel. The sharing of the lighting condition data may mitigate noise due to sparsely sampling lighting conditions in ray tracing.

In at least one embodiment, the filtering for a pixel(s) may be guided based at least in part on the variance computed by the variance determiner 112 for the pixel(s). For example, determining one or more parameters of a filter(s) and/or filter passes applied by the image filterer 114 may be determined based at least on the variance. In at least one embodiment, the one or more parameters define a range of filter values for the filter(s) and/or filter passes and the image filterer 114 may incorporate the temporal ray-traced samples with spatial samples and/or other render data based on the range of the filter values. In various examples, the range may define a set of filter values for a pixel(s) and may be based on the variance of the pixel(s). For example, in applying a filter and/or filter pass to a pixel, the image filterer 114 may exclude the set of the filter values from the filtering based at least on the set being outside of the range.

Figure 3:
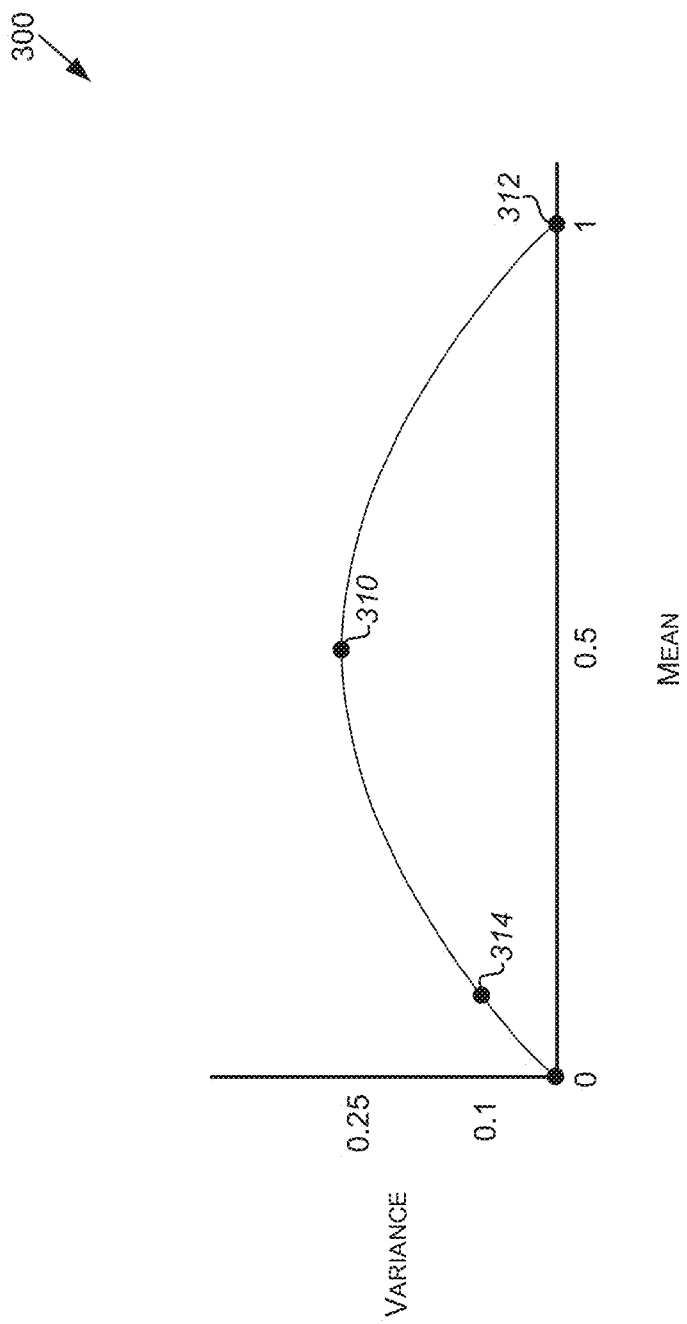
FIG. 3 is a diagram illustrating an example of a distribution function that may be used to determine a range of filter values for a filter, in accordance with some embodiments of the present disclosure.

Referring now to FIG. 3, FIG. 3 is a diagram illustrating an example of a distribution function 300 that may be used to determine a range of filter values for a filter, in accordance with some embodiments of the present disclosure. The distribution function 300 may be used to define the one or more parameters of the filter(s) and in the example shown corresponds to a Bernoulli distribution. For example, the distribution function 300 may correspond to Equation (2) where i corresponds to a binary random or pseudorandom (e.g., stochastic) signal. In various examples, the distribution function 300 may be different than what is shown, and/or may be derived from or otherwise correspond to variance and/or Equation (2). Further, in some examples, the distribution function 300 may correspond to distributions which may be defined using any number of moments.

In some examples, in applying a filter to an initial pixel position using convolution, as described herein, the image filterer 114 may evaluate data values for pixels that correspond to the local neighbors in the matrix, and refrain from combining the data values that are outside of the range. Additionally or alternatively, the data values that are within the range may be combined using the convolution. In some examples, one or more of the data values may have a filter weight that is based at least on the range. The filter weight for a data value of a neighbor pixel may decrease (or be reduced) based at least on a distance of the data value from a data value of the initial pixel position. In any example, the range may be centered at the data value of the initial pixel position. In some examples, filter weights for data values within the range may not be modified based on falling within the range, but may be modified for other reasons.

In at least one embodiment, the one or more parameters of a filter and/or filter pass may be based at least in part on a result or solution of applying one or more variables that correspond to the first moment and/or the second moment (e.g., variance variables) to the distribution function 300. For example, with reference to FIG. 3, the solution to Equation (2) may define one or more extents or bounds of the range for filter values. For example, the range may be defined by the data value plus and minus the solution to the distribution function 300. To illustrate the forgoing, when the mean (first moment) is 0.5, the solution may be 0.25 at point 310 of the distribution function 300. The image filterer 114 may then define the range as 0.5+ or −0.25, which is from 0.25 to 0.75 meaning that the filter(s) may accept most data values. At point 312, only data values of 1 may be accepted by the filter(s). As indicated by point 314, the range may decrease towards the maximum and minimum values of the first moment (e.g., as the variance decreases from the maximum).

The examples of FIG. 3 are particularly suitable for binary signals, and in particular visibility signals. For example, point 312 may correspond to a pixel that is fully lit (e.g., unshadowed), so that there is no variance in the temporal ray-traced samples. As a result, it may be desirable to only accept data values that are the same or near the data value of the pixel for filtering. The point 314 may correspond to a pixel associated with a dark region of a penumbra, where there still may be a moderate amount of variance. As a result, it may be desirable to accept data values that are moderately farther from the data value of the pixel for filtering. The point 310 may correspond to a pixel associated with a lighter region of a penumbra, where there may be a high amount of variance. As a result, it may be desirable to accept most or all of the data values for filtering.

Figure 4:
FIG. 4 is a diagram illustrating an example of a frame of a virtual environment that may be generated using shadow denoising, in accordance with some embodiments of the present disclosure.

Using disclosed approaches may maintain contact hardening as penumbra regions are relatively small closer to the occluder. For example, FIG. 4 is a diagram illustrating an example of a frame 400 of the virtual environment 200 that may be generated using shadow denoising, in accordance with some embodiments of the present disclosure. The frame 400 may correspond to the output image 120 of FIG. 1. As can be seen, contact hardening is maintained in regions 430 and 432 near the occluders.

Skipping Spatial Filtering for a Pixel(s)

In accordance with further aspects of the present disclosure, spatial filtering may be skipped for a pixel for a frame based at least in part on determining that the mean, first moment, and/or variance computed from temporally ray-traced samples associated with the pixel is greater than or equal to a first threshold, and/or less than or equal to a second threshold, and that a count of the values exceeds a third threshold.

For example, where the variance is less than or equal to a threshold value (e.g., zero) and a count of the values exceeds a third threshold (e.g., 8 frames worth of samples), spatial filtering may be skipped for the pixel, thereby conserving processing power. In the example of FIG. 3, the variance is 0 where the mean is 0 or 1. Therefore, in some examples, the mean may be evaluated by the image filterer 114 and filtering may be skipped based on determining the mean is greater than or equal to the first threshold (e.g., 1), and/or based on determining the mean is less than or equal to the second threshold (e.g., 0). Additionally or alternatively, the mean may be evaluated by the image filterer 114 and filtering may be performed based at least on determining the mean is less than the first threshold (e.g., 1), and/or based on determining the mean is greater than the second threshold (e.g., 0).

The mean is one example of a variable that may be evaluated to determine whether to skip filtering for a pixel. In other examples, one or more other variables may be evaluated with respect to one or more thresholds and/or a solution to a corresponding distribution function (e.g., a variance value) may be evaluated with respect to one or more thresholds. While a count is described as being evaluated for a pixel, generally, any variable and/or criteria that corresponds to and/or indicates the count may be used. In some examples, criteria corresponding to a solution (e.g., variance) to the distribution function and the count may be incorporated into one or more values which may be evaluated against one or more thresholds. Thus, there may be various approaches to factoring in these criteria when determining whether to skip filtering for a pixel and/or whether to perform filtering for a pixel.

Present approaches may be used for any suitable ray tracing effect or technique, such as for global illumination, ambient occlusion, shadows, reflections, refractions, scattering phenomenon, and dispersion phenomenon. Thus, for example, while in some examples, the ray-traced samples may correspond to visibility samples, in other examples, the ray-traced samples may correspond to color luminance. Further, present approaches may be implemented in a different rendering pipeline as shown in FIG. 1, which may or may not use the image combiner 116 to combine output from the 3D renderer 118.

Figure 5:
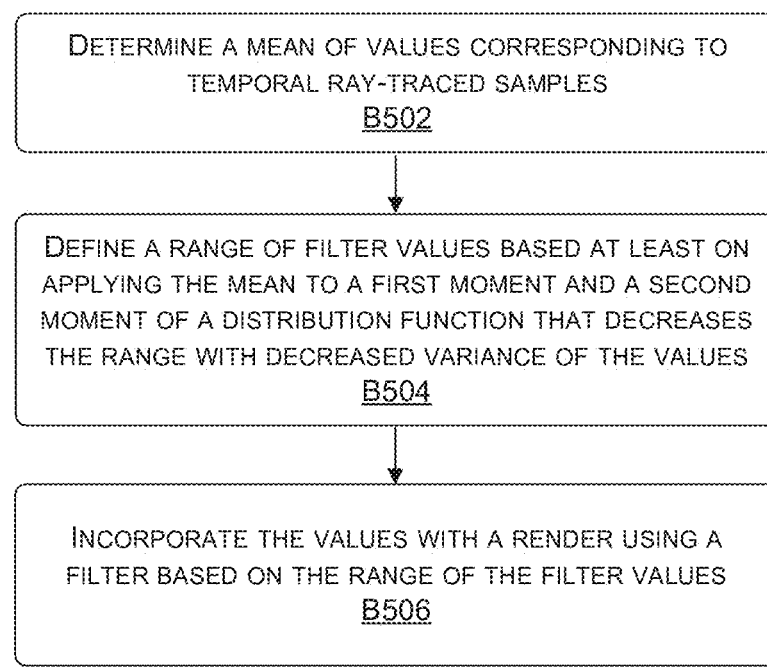
FIG. 5 is a flow diagram showing an example of a method for defining a range of filter values based at least on a mean of visibility values, in accordance with some embodiments of the present disclosure.
Figure 6:
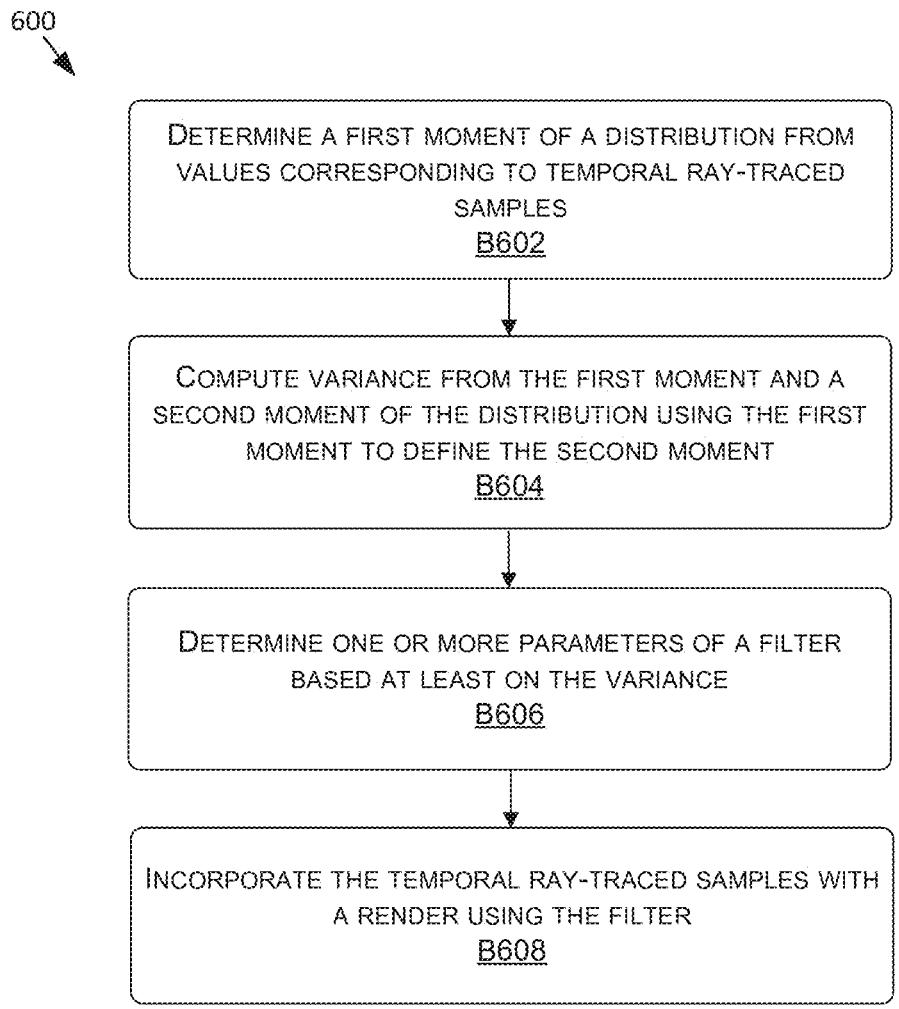
FIG. 6 is a flow diagram showing an example of a method for using a first moment of a distribution used to compute variance to define a second moment of the distribution in filtering ray-traced samples, in accordance with some embodiments of the present disclosure.
Figure 7:
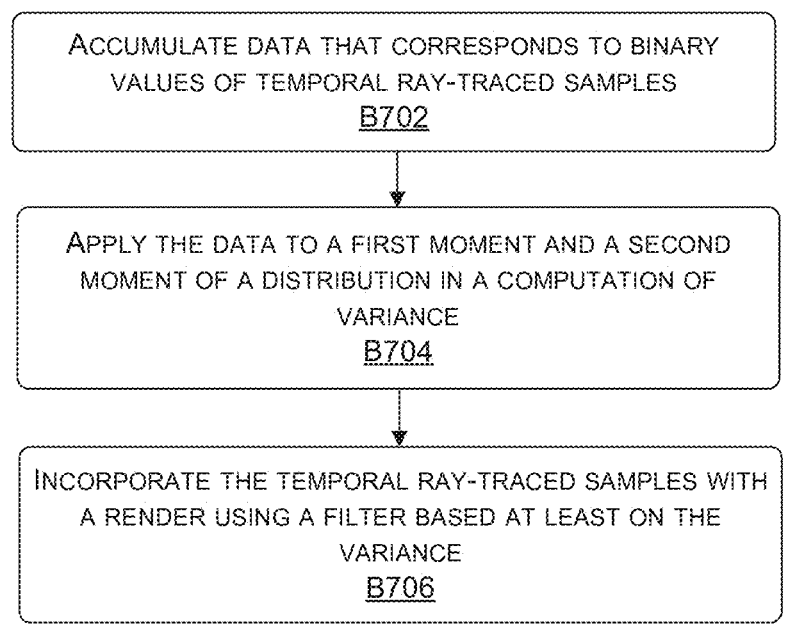
FIG. 7 is a flow diagram showing an example of a method for applying data corresponding to an accumulated first moment of a distribution to a second moment of the distribution in filtering ray-traced samples that correspond to a binary signal, in accordance with some embodiments of the present disclosure.

Now referring to FIGS. 5-7, each block of methods 500, 600, and 700, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the image rendering system 100 (FIG. 1). However, these methods may additionally or alternatively be executed by any one system, or any combination of systems, including, but not limited to, those described herein.

FIG. 5 is a flow diagram showing an example of a method 500 for defining a range of filter values based at least on a mean of visibility values, in accordance with some embodiments of the present disclosure. The method 500 may apply to any of the examples of FIGS. 2-4, or other examples. The method 500, at block B502, includes determining a mean of values corresponding to temporal ray-traced samples. For example, the temporal moment accumulator 108 may determine a mean of values corresponding to temporal ray-traced samples of visibility of one or more pixels over a plurality renders of the virtual environment 200.

The method 500, at block B504, includes defining a range of filter values based at least on applying the mean to a first moment and a second moment of a distribution function that decreases the range with decreased variance of the values. For example, the variance determiner 112 may define a range of filter values for a spatiotemporal filter based at least on applying the mean to at least first and second moments of a distribution function that decreases the range with decreased variance of the values. In embodiments, the distribution function may correspond to Equation (2) and FIG. 3.

The method 500, at block B506, includes incorporating the values with a render using a filter based at least on the range of the filter values. For example, the image filterer 114 incorporates the values corresponding to the temporal ray-traced samples of visibility with a render of the virtual environment 200 using the spatiotemporal filter based on the range of the filter values.

Referring now to FIG. 6, FIG. 6 is a flow diagram showing an example of a method 600 for using a first moment of a distribution used to compute variance to define a second moment of the distribution in filtering ray-traced samples, in accordance with some embodiments of the present disclosure. The method 600 may apply to the examples of any of FIGS. 2-4, or other examples. The method 600, at block B602, includes determining a first moment of a distribution used to compute variance a distribution from values corresponding to temporal ray-traced samples. For example, the temporal moment accumulator 108 may determine a first moment (e.g., mean) of variance of values corresponding to temporal ray-traced samples of one or more pixels over a plurality renders of the virtual environment 200.

The method 600, at block B604, includes computing variance from the first moment and a second moment of the distribution using the first moment to define the second moment. For example, the variance determiner 112 may compute variance from the first moment and a second moment of the temporal variance using the first moment to define the second moment (e.g., using Equation (2)).

The method 600, at block B606, includes determining one or more parameters of a filter based at least on the computed variance. For example, the image filterer 114 may determine one or more parameters of a filter based at least on the variance.

The method 600, at block B608, includes incorporating the temporal ray-traced samples with a render of the virtual environment using the filter. For example, the image filterer 114 may incorporate the temporal ray-traced samples with a render of the virtual environment using the filter applied to the render at a location (e.g., pixel location) that corresponds to the one or more pixels.

Referring now to FIG. 7, FIG. 7 is a flow diagram showing an example of a method 700 for applying data corresponding to an accumulated first moment of a distribution to a second moment of the distribution in filtering ray-traced samples that correspond to a binary signal, in accordance with some embodiments of the present disclosure. The method 700 may apply to the examples of any of FIGS. 2-4, or other examples. The method 700, at block B702, includes accumulating data that corresponds to binary values of temporal ray-traced samples. For example, the temporal moment accumulator 108 may accumulate, over a plurality of frames, data that corresponds to binary values of temporal ray-traced samples of the virtual environment 200.

The method 700, at block B704, includes applying the data to a first moment and a second moment of a distribution in a computation of variance. For example, the variance determiner 112 may apply the data to a first moment and a second moment of a distribution in a computation of variance of the binary values.

The method 700, at block B706, includes incorporating the temporal ray-traced samples with a render using a filter based at least on the variance of the binary values. For example, the image filterer 114 may incorporate the temporal ray-traced samples with a render of the virtual environment 200 using a filter applied to the render based at least on the variance of the binary values.

Example Computing Device

Figure 8:
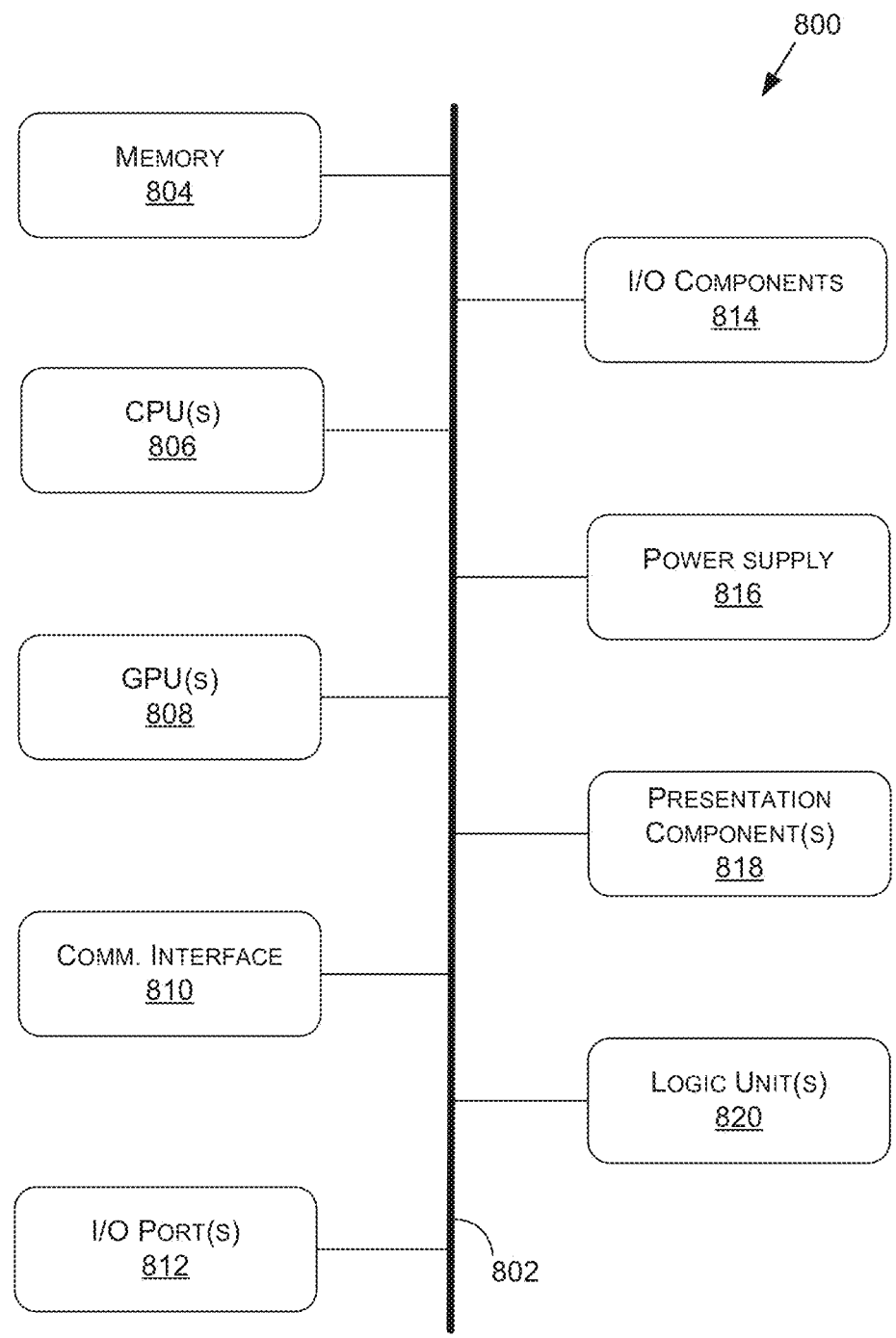
FIG. 8 is a block diagram of an example computing environment suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, etc.), and output the data (e.g., as an image, video, sound, etc.).

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Example Data Center

Figure 9:
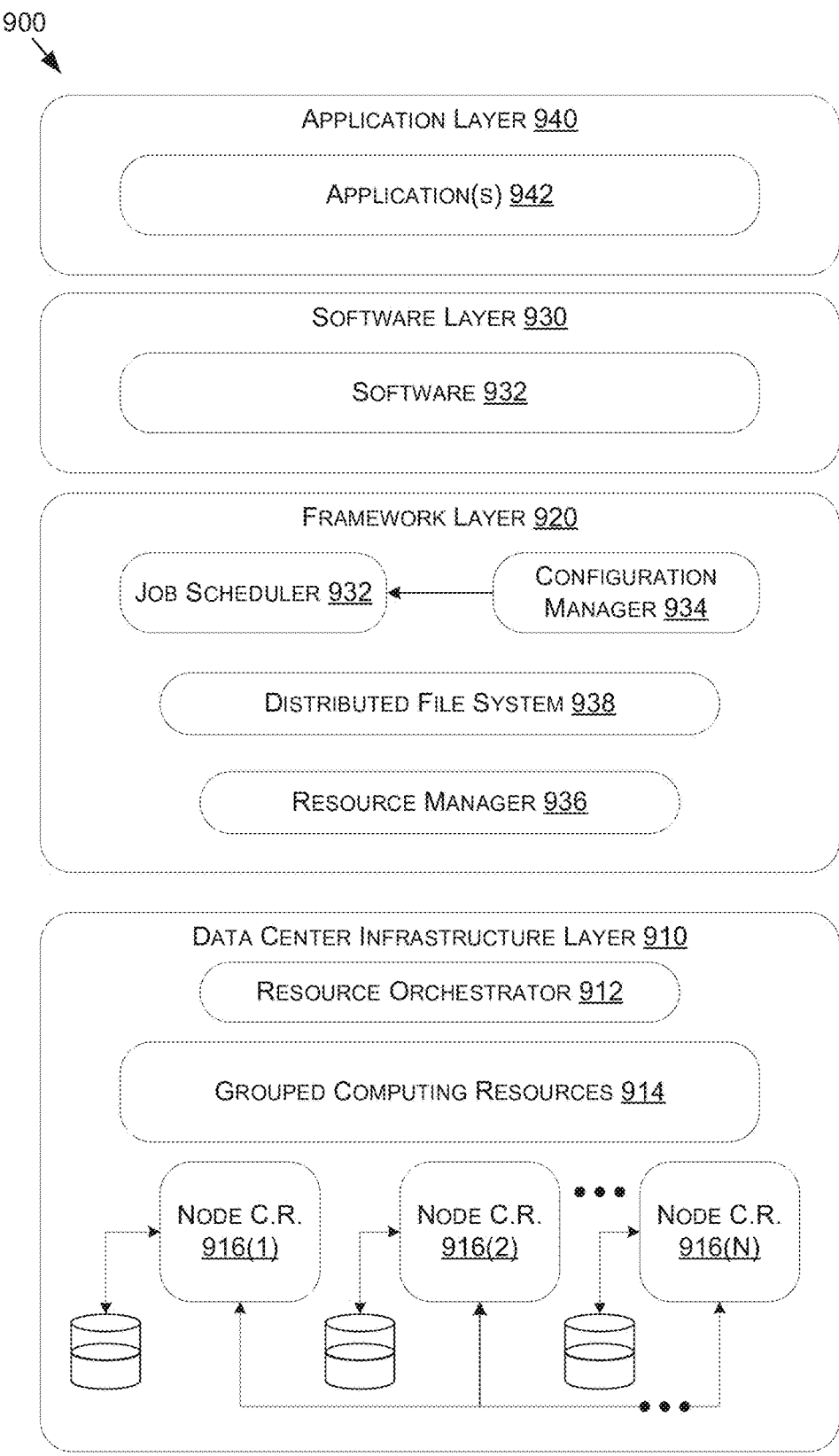
FIG. 9 is a block diagram of an example data center suitable for use in implementing some embodiments of the present disclosure.

FIG. 9 illustrates an example data center 900, in which at least one embodiment may be used. In at least one embodiment, data center 900 includes a data center infrastructure layer 910, a framework layer 920, a software layer 930 and an application layer 940.

In at least one embodiment, as shown in FIG. 9, data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 916(1)-916(N) may be a server having one or more of above-mentioned computing resources.

In at least one embodiment, grouped computing resources 914 may include separate groupings of node C.R.s housed within one or more racks (not shown), or many racks housed in data centers at various geographical locations (also not shown). Separate groupings of node C.R.s within grouped computing resources 914 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 912 may configure or otherwise control one or more node C.R.s 916(1)-916(N) and/or grouped computing resources 914. In at least one embodiment, resource orchestrator 912 may include a software design infrastructure ("SDI") management entity for data center 900. In at least one embodiment, resource orchestrator may include hardware, software or some combination thereof.

In at least one embodiment, as shown in FIG. 9, framework layer 920 includes a job scheduler 932, a configuration manager 934, a resource manager 936 and a distributed file system 938. In at least one embodiment, framework layer 920 may include a framework to support software 932 of software layer 930 and/or one or more application(s) 942 of application layer 940. In at least one embodiment, software 932 or application(s) 942 may respectively include web-based service software or applications, such as those provided by Amazon Web Services, Google Cloud and Microsoft Azure. In at least one embodiment, framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 932 may include a Spark driver to facilitate scheduling of workloads supported by various layers of data center 900. In at least one embodiment, configuration manager 934 may be capable of configuring different layers such as software layer 930 and framework layer 920 including Spark and distributed file system 938 for supporting large-scale data processing. In at least one embodiment, resource manager 936 may be capable of managing clustered or grouped computing resources mapped to or allocated for support of distributed file system 938 and job scheduler 932. In at least one embodiment, clustered or grouped computing resources may include grouped computing resource 914 at data center infrastructure layer 910. In at least one embodiment, resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. In at least one embodiment, self-modifying actions may relieve a data center operator of data center 900 from making possibly bad configuration decisions and possibly avoiding underutilized and/or poor performing portions of a data center.

In at least one embodiment, data center 900 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 900. In at least one embodiment, trained machine learning models corresponding to one or more neural networks may be used to infer or predict information using resources described above with respect to data center 900 by using weight parameters calculated through one or more training techniques described herein.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer-implemented method comprising:
   determining data corresponding to temporal ray-traced samples of one or more pixels over a plurality of renders of a virtual environment;
   defining a range of values for data values of pixels having positions within a footprint of a spatiotemporal filter based at least on applying the data to a first moment and a second moment of a distribution function;
   determining, using the spatiotemporal filter, an aggregation of the data values of the pixels based at least on evaluating a data value of the data values using the range of values; and
   generating an image of the virtual environment using the aggregation of the data values.

2. The method of claim 1, wherein the applying of the data to the first moment and the second moment of the distribution function computes variance in the temporal ray-traced samples.

3. The method of claim 1, wherein the range of values is determined from variance in the temporal ray-traced samples.

4. The method of claim 1, wherein the determining the aggregation includes excluding the data value from the aggregation based at least on the data value falling outside of the range of values.

5. The method of claim 1, wherein the distribution function corresponds to a Bernoulli distribution.

6. The method of claim 1, wherein the determining the aggregation includes including the data value in the aggregation based at least on the data value falling within of the range of values.

7. The method of claim 1, wherein the range is at a minimum when a mean value of the temporal ray-traced samples is at a maximum or minimum.

8. The method of claim 1, wherein the determining the aggregation includes computing a weight value for the data value in the aggregation using the range of values.

9. The method of claim 1, wherein the using of the spatiotemporal filter is based at least on determining that a mean of values of the temporal ray-traced samples is less than or equal to a second threshold, and that a count of the values exceeds a third threshold.

10. A computer-implemented method comprising:
    determining data representing a first moment of a distribution from values corresponding to temporal ray-traced samples of one or more pixels over a plurality of renders of a virtual environment;
    computing variance from the first moment and a second moment of the distribution based at least on determining the second moment using the data representing the first moment;
    determining one or more parameters of a filter based at least on the variance; and
    incorporating the temporal ray-traced samples with a render of the virtual environment using the filter applied to the render at a location that corresponds to the one or more pixels.

11. The method of claim 10, wherein the temporal ray-traced samples correspond to a visibility of the one or more pixels with respect to one or more light sources in the virtual environment.

12. The method of claim 10, wherein the values correspond to a binary signal.

13. The method of claim 10, wherein the first moment comprises a mean of the values and the second moment comprises the mean of the values squared.

14. The method of claim 10, further comprising accumulating the data representing the first moment to a buffer over the plurality of renders, wherein the determining the data representing the first moment comprises retrieving the first moment from the buffer based on the location that corresponds to the one or more pixels.

15. The method of claim 10, wherein the temporal ray-traced samples correspond to ambient occlusion of the one or more pixels with respect to the virtual environment.

16. The method of claim 10, wherein the one or more parameters define a range of values for data values of pixels having positions within a footprint of the filter and the incorporating of the temporal ray-traced samples with the render using the filter includes aggregating the data values using the range of values.

17. A computer-implemented method comprising:
    accumulating, over a plurality of frames, data representing a first moment of a distribution that corresponds to binary values of temporal ray-traced samples of a virtual environment;
    computing, using the data, a second moment of the distribution in a computation of variance of the binary values; and
    incorporating the temporal ray-traced samples with a render of the virtual environment using a filter applied to the render based at least on the variance of the binary values.

18. The method of claim 17, wherein the temporal ray-traced samples correspond to visibility of one or more pixels with respect to one or more light sources in the virtual environment.

19. The method of claim 17, wherein the applying of the data to the second moment comprises computing the second moment from the first moment.

20. The method of claim 17, wherein the incorporating the temporal ray-traced samples with the render further comprises determining a range of values for data values of pixels processed using the filter based on the computation, and the incorporating of the temporal ray-traced samples with the render using the filter is based on the range of the values.

21. The method of claim 17, further comprising generating the temporal ray-traced samples using at least one shadow ray for each pixel of one or more pixels associated with the plurality of frames.

22. The method of claim 17, wherein the first moment corresponds to a mean and the second moment corresponds to the mean squared.

23. The method of claim 17, wherein the virtual environment generated by at least one of:
- a system for performing simulation operations;
- a system for performing simulation operations to test or validate autonomous machine applications;
- a system for performing deep learning operations;
- a system implemented using an edge device;
- a system incorporating one or more Virtual Machines (VMs);
- a system implemented at least partially in a data center; or
- a system implemented at least partially using cloud computing resources.

\* \* \* \* \*